(12) United States Patent
Van Wijk et al.

(10) Patent No.: US 6,517,455 B1
(45) Date of Patent: Feb. 11, 2003

(54) CONTINUOUSLY VARIABLE TRANSMISSION WITH AN ELECTRO-HYDRAULIC CONTROL SYSTEM AND METHOD FOR OPERATING SUCH TRANSMISSION

(75) Inventors: Wilhelmus Johannes Maria Van Wijk, Udenhout (NL); Hendrikus Adrianus Arnoldus Wilhelmina Pelders, Nuland (NL)

(73) Assignee: Van Doorne's transmissie B.V., Tilburg (NL)

( * ) Notice: Subject to any disclaimer, the term of this patent is extended or adjusted under 35 U.S.C. 154(b) by 0 days.

(21) Appl. No.: 09/708,512

(22) Filed: Nov. 9, 2000

(30) Foreign Application Priority Data

Nov. 11, 1999 (EP) .............................. 99203765

(51) Int. Cl.[7] .............................. F16H 59/00
(52) U.S. Cl. .......................... 474/18; 474/28
(58) Field of Search ...................... 474/18, 28; 427/45, 427/906, 907; 251/63

(56) References Cited

U.S. PATENT DOCUMENTS

| 4,557,706 A | * 12/1985 | Tanaka et al. | ................ 474/28 |
| 4,601,368 A | * 7/1986 | van Deursen | ................ 192/3.3 |
| 5,232,406 A | * 8/1993 | Sato | .................... 474/28 |
| 5,885,186 A | * 3/1999 | Van Wijk et al. | ............. 477/43 |

FOREIGN PATENT DOCUMENTS

| DE | 198 29 642 | 1/1999 | |
| EP | 0 134 725 | 3/1985 | |
| EP | 0 793 039 | 9/1997 | |
| JP | 63-152755 | * 6/1988 | ........... F16H/11/06 |

\* cited by examiner

Primary Examiner—David A. Bucci
Assistant Examiner—Timothy McAnulty
(74) Attorney, Agent, or Firm—Young & Thompson (57) ABSTRACT

Continuously variable transmission provided with a first pulley having two pulley discs, with a second pulley having two pulley discs and with a drive belt wound around the pulleys for transmitting torque therebetween, at least one disc of the first pulley being axially movable with respect to the other disc of the pulley under the influence of an axial force provided on the movable disc by a hydraulic pressure in a cylinder of a piston/cylinder assembly associated with the first pulley. The continuously variable transmission is further provided with a control system capable of controlling the pressure in the cylinder and including a pump for generating a flow of hydraulic medium from a reservoir to a main hydraulic line and a line pressure valve at least operable by a control pressure which is regulated by an electronically operable pressure regulator, for controlling a line pressure in the main hydraulic line. Additionally the control system includes a pressure control device capable of influencing the line pressure by providing a further pressure on a part of the line pressure valve.

6 Claims, 4 Drawing Sheets

CONTINUOUSLY VARIABLE TRANSMISSION WITH AN ELECTRO-HYDRAULIC CONTROL SYSTEM AND METHOD FOR OPERATING SUCH TRANSMISSION

BACKGROUND OF THE INVENTION

The invention relates to a continuously variable transmission or CVT provided with an electro-hydraulic control system and a method for operation thereof. The CVT is known, for example, from EP-A-0.787.927 and is in particular suited for motor vehicles.

DESCRIPTION OF THE RELATED ART

The known CVT comprises a V-type drive belt wound around a first pulley provided on a first shaft and a second pulley provided on a second shaft. Both pulleys have two conical discs, an axial separation of which is adjustable by means of a piston/cylinder assembly of each pulley. During operation of the transmission the drive belt is clamped with a first clamping force between the discs of the first pulley and with a second clamping force between the discs of the second pulley. The clamping forces are effected by exerting a pressure in a piston/cylinder-assembly associated with a pulley for each of said first and second pulleys. The level of the clamping forces determines the maximum amount of torque that can be transmitted between said first and second shaft virtually without relative movement in the tangential direction between the drive belt and the discs of the pulleys, i.e. belt slip, occurring. The (instantaneous) maximum amount of torque is referred to as the (instantaneous) torque transmitting capacity of the CVT. In the CVT a transmission ratio is related to the ratio of the running radii of the drive belt between the discs of the pulleys, which may be influenced by changing the ratio of the pressures in the piston/cylinder assemblies. An electro-hydraulic control system is provided to control said pressures and to achieve an appropriate transmission ratio and torque transmitting capacity of the continuously variable transmission.

It is generally known in the art, that the efficiency of the CVT is inversely proportional to the clamping forces applied by the pulley discs to the drive belt. Therefore, the control system is preferably arranged such that the lowest allowable clamping force for achieving torque transmission without belt slip is applied to the belt. For effecting the clamping forces, the control system is provided with a hydraulic system comprising a source of hydraulic medium in the form of a pump and a line pressure valve for controlling the pressure of the medium delivered by the pump to a main hydraulic line, the so called line pressure. To minimise energy loss, said line pressure is equal to, but not higher than, the highest pressure applied in the cylinders of the piston/cylinder assemblies. The control system is further provided with an electronic system comprising an electronic control unit (ECU) for generating a control current operating said line pressure valve in dependence on one or more variables, such as the transmission ratio, rotational speed of the pulleys and/or the torque to be transmitted by the transmission. Usually said line pressure valve is operated through applying a range of control pressures to said valve, which control pressure is regulated by an electronically operable pressure regulator, which in turn is operated by said control current. The pressure regulator derives said control pressure from an essentially constant pressure regulator feed pressure, which is somewhat higher than the maximum level of the control pressure to be applied. The control current generated by the ECU for operating the pressure regulator typically varies in a range between 0 and 1 Ampere. In dependence on said control current the control pressure regulated by the pressure regulator typically varies in a range between 0 and 6 bar, whereas the feed pressure is typically about 7.5 bar.

The known set-up of the control system is adopted both in conventional CVTs where line pressures are applied ranging from a few bar to 45 bar and in the currently favoured transmission designs, where the maximum line pressure level applied may range from 80 to 90 bar depending on CVT design specifics. Current developments in CVT design indicate that said maximum level might increase even further.

It appears that in the currently favoured CVT designs the accuracy with which the line pressure may be controlled does not meet the accuracy formerly achieved in conventional CVT designs. However, as was mentioned earlier, it is desirable for efficiency considerations to be able to accurately control the line pressure, so that the lowest allowable line pressure is set, while still effectively preventing belt slip.

SUMMARY OF THE INVENTION

It Is an object of the invention to improve the efficiency of currently favoured CVT designs and in general to provide for a CVT with a control system capable of accurate control of the line pressure. According to the invention these objects may be achieved by a CVT having the features defined in the characterising portion of claim 1. It is also an object of the invention to provide for a method for accurately and efficiently operating the CVT of currently favoured design. According to the invention this object may be achieved by adopting the method according to claim 13.

The CVT of the invention is characterized by pressure control means that are capable of influencing the line pressure by a further pressure acting on a part of the line pressure valve. In effect this means that the line pressure valve is controllable both by said control pressure and by said further pressure. This has the advantage that a number of options are opened for a considerable improvement of the accuracy of the control system and thereby of the transmission efficiency. According to the invention it is, for example, possible to use the control pressure to operate the line pressure valve so that approximately the required line pressure is set and to use the further pressure to fine tune the setting of the line pressure valve. In this manner it is achieved that the accuracy of the line pressures control and thus also the efficiency of the CVT is improved considerably.

According to an elaboration the invention the pressure control means comprise a further pressure regulator capable of regulating the further control pressure that serves as said further pressure. According to the invention it is advantageous, if in a first part of the range of applied line pressure levels, e.g. the lower halve between a few bar and approximately 45 bar, the line pressure valve is controlled by the control pressure regulated by the known pressure regulator, whereas the a second part of said range, e.g. the upper halve approximately between 45 and 87 bar, the valve is controlled by the further control pressure serving as said further pressure and regulated by the further pressure regulator. In this manner the pressure regulator and the further pressure regulator are effectively adopted in series, so that the total range of control pressure levels available for controlling the line pressure valve is essentially doubled. It was found that the extra cost from incorporating such pressure control means might be overcome by the positive effect they have on the efficiency of the CVT.

According to another elaboration of the invention, which is particularly suited for a CVT having a hydraulic circuit which is arranged such that the pressure in the cylinder of the piston/cylinder associated with the first pulley is said line pressure, whereas the pressure in the cylinder of the piston/cylinder associated with the second pulley is determined by means of a flow control valve capable of controlling a flow of hydraulic medium from said main hydraulic line to said piston/cylinder assembly or a flow from said piston/cylinder assembly to said reservoir. According to the invention the pressure control means comprise a passage connecting the piston/cylinder assembly associated with the second pulley to the line pressure valve, such that the pressure in said piston/cylinder assembly serves as said further pressure capable of influencing the line pressure. The control system, or more in particular the line pressure valve, is arranged such that when said pressure in the piston/cylinder assembly associated with the second pulley increases, the range of line pressure levels that can be set by regulating the control pressure decreases. Since the range of the control pressure levels remains unchanged, an increasingly more favourable ratio between the range of line pressure levels and the range of control pressure levels is obtained, when the pressure in the cylinder of the piston/cylinder assembly of the second pulley increases. The accuracy with which the control system can control the line pressure is thus made dependent on the pressure in the piston/cylinder assembly of the second pulley in such a manner that said accuracy increases when said latter pressure increases. Since the pressure in the piston/cylinder assembly of the second pulley increases with increasing transmission ratio, which for this purpose is defined as the rotational speed of the first pulley divided by that of the second pulley, the accuracy of the control system increases with increasing transmission ratio.

The advantage of such a control system is given by the insight that a CVT is operated for relatively long periods of time at the higher transmission ratios, the so-called OD-ratios. The lowest transmission ratios, the so-called Low-ratios, are usually primarily used during acceleration of a vehicle. In terms of efficiency it is thus important to be able to accurately control the line pressure when the transmission is in a OD-ratio, whereas a relatively inaccurate line pressure control in a Low-ratio will not have a large impact on the overall transmission efficiency. The present elaboration of the invention provides simple and cost efficient means to improve the accuracy of the control system particularly in OD-ratios. The factor with which the accuracy of the control system is improved in OD-ratios compared to the accuracy in Low-ratios is dependent on the design of the line pressure valve, but may typically be about 2 or even more.

According to yet another elaboration of the invention the pressure control means comprise a further valve capable of selectively allowing an essentially constant auxiliary pressure to serve as said further pressure. Preferably, said further valve is a switch-type valve, which allows either the control pressure or the auxiliary pressure to control the line pressure valve. Said auxiliary pressure is chosen somewhat higher than the maximum control pressure level that may be regulated by the pressure regulator. The line pressure valve is arranged such that under the influence of said auxiliary pressure the maximum applied line pressure level is set. According to the invention the pressure regulator feed pressure is particularly suited to serve as said auxiliary pressure. The feed pressure is used to set the line pressure valve when the applied line pressure lies in an upper most part of the range of applied line pressure levels, whereas the line pressure valve is controlled by the control pressure when said line pressure required for preventing belt slip lies in other parts of said range. According to the invention a threshold pressure $P_{LP,th}$ at which said upper most part starts can be calculated from:

$$P_{LP,th} = P_{CP,max}/P_{AUX} \cdot P_{LP,max}$$

wherein: $P_{CP,max}$ is the maximum applied control pressure level, $P_{AUX}$ is the auxiliary pressure, which in this case is equal to the pressure regulator feed pressure $P_{PR}$, $P_{LP,max}$ is the maximum applied line pressure level.

The advantage of this particular elaboration of the control system according to the invention is given by the insight that the higher line pressures are usually applied only when transmitting the highest torque levels, e.g. during a fast accelerations of a vehicle in which the CVT is adopted. It is found that during operation of the CVT such torque levels only occur in a relatively small part of the total time span of operation. This is particularly true if the CVT is provided with a torque converter, as is common practice in CVT design. It is thus possible to set the maximum line pressure level using the auxiliary pressure, even if a somewhat lower line pressure is actually required to prevent belt slip, while still maintaining good transmission efficiency. The entire range of control pressure levels is then available for control of the line pressure within only a part of the range of applied line pressure levels. The accuracy of the control system is thereby improved by a factor, which is given by the ratio between the auxiliary pressure and the maximum of the range of control pressure levels.

The invention also provides for a method allowing accurate control of the line pressure of the CVT. The method according to claim 13 is suited for the known CVT wherein the control system is capable of controlling the line pressure within a range of line pressure levels applied by means of a line pressure valve when operated by a control pressure varying-within a range of control pressure. In such a control system a control pressure resolution may be defined as the ratio between said range control pressure levels and a range of line pressure levels to be applied by means of a line pressure valve when operated by said range of control pressure levels. This resolution is a measure for the accuracy of the line pressure control. According the invention said resolution may be improved by providing for a further pressure capable of influencing the line pressure valve. In effect this means that several options are opened to improve the accuracy of the control system by decreasing said range of line pressure levels to be applied by means of a line pressure valve when operated by said range of control pressure levels. The method at least comprises the steps of:

determining a desired line pressure based on a number of signals at least representing the transmission ratio, the torque to be transmitted and the rotational speed of a pulley, generating the control current for control of the pressure regulator at least in dependence on said desired line pressure and providing a further pressure capable of controlling said line pressure valve so as to effect an increase of the control pressure resolution by decreasing the range of line pressure levels applied by means of a line pressure valve when operated by said range of control pressure levels.

According to a development of the invention a further pressure regulator for regulating a further control pressure which serves as said further pressure may be provided. In this case the method according to the invention additionally comprises the step of:

generating a further control current for control of a further pressure regulator at least in dependence on said desired line pressure, such that a further control pressure is regulated which serves as said further pressure. The particular advantages of this development of the invention being that the accuracy of the control system may be improved in the entire operational range of the CVT, e.g. independent on the transmission ratio, and that the improvement may be quite large, i.e. up to two a factor of 2.

According to another development of the invention a hydraulic line connecting the cylinder of the piston/cylinder assembly of the second pulley to the line pressure valve may be provided, such that the pressure in said cylinder serves as said further pressure. In this case the method according to the invention additionally comprises the step of:

determining a pressure actually present in the cylinder of the piston/cylinder assembly associated with the second pulley which serves as said further pressure Furthermore, in order to generate the appropriate control current for control of the pressure regulator, said current is generated additionally in dependence on the level of said pressure actually present in the cylinder of the piston/cylinder assembly associated with the second pulley. The particular advantage of this development of the invention being that the method may be implemented at low a cost.

According to still another development of the invention a valve may be provided for selectively allowing the line pressure valve to be controlled either by the control pressure or by an essentially constant auxiliary pressure which serves as said further pressure. In this case the method according to the invention additionally comprises the steps of:

determining if the desired line pressure is higher than a predetermined threshold pressure and setting the line pressure valve by means of an essentially constant auxiliary pressure which serves as said further pressure if the desired line pressure is higher than said predetermined threshold pressure.

The particular advantage of this development of the invention being that the accuracy of the control system may be improved in the entire operational range of the CVT, e.g. independent on the transmission ratio.

BRIEF DESCRIPTION OF THE DRAWINGS

In the following the invention is elucidated further with reference to the accompanying figures.

DESCRIPTION OF THE PREFERRED EMBODIMENTS

Figure 1:
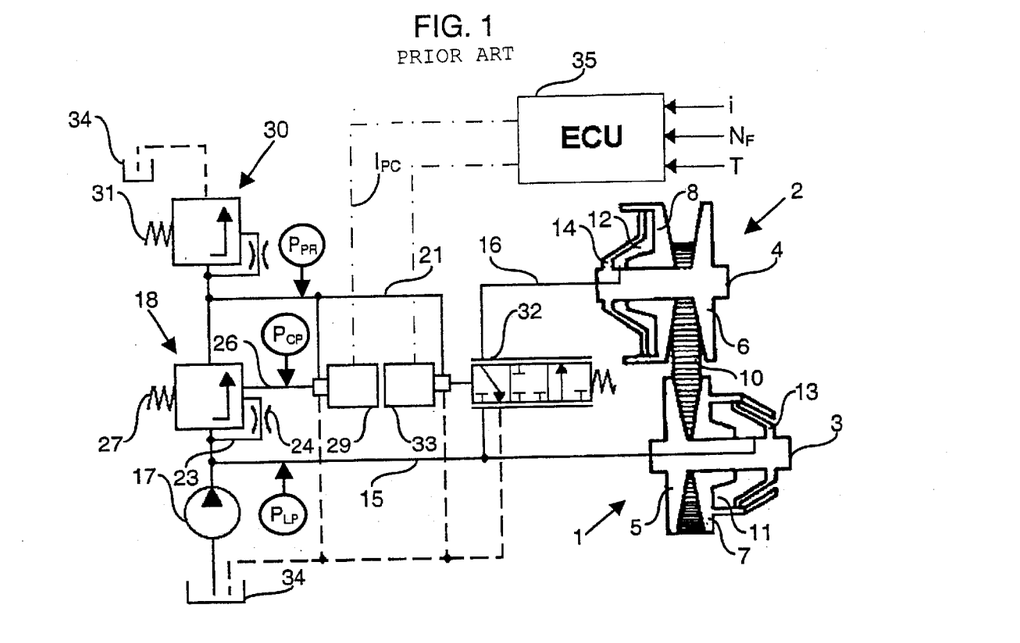
FIG. 1 shows a schematic representation of a CVT with an electro-hydraulic control system according to the state of the art.

FIG. 1 shows a schematic representation of a CVT with an electro-hydraulic control system according to the state of the art. The CVT comprises a first pulley 1 on a first shaft 3 and a second pulley 2 on a second shaft 4. A drive belt 10 is mounted around said pulleys 1, 2 for transmitting torque between said shafts 3, 4. Each pulley 1 or 2 has a fixed disc 5 or 6 and an axially moveable disc 7 or 8 respectively. Piston/cylinder-assemblies 11, 13 and 12, 14 are provided for axially displacing said movable discs 7 and 8. Cylinders 11 and 12 of the piston/cylinder-assemblies 11, 13 and 12, 14 are part of an electro-hydraulic control system and are connected to other parts of the system by means of a main hydraulic line 15 and a further hydraulic line 16 respectively. The control system comprises a hydraulic circuit which is provided with a pump 17 for generating a flow of hydraulic medium from a reservoir 34 to said main hydraulic line 15 and with a line pressure valve 18 for controlling a line pressure $P_{LP}$ of said hydraulic medium in the main hydraulic line 15 and thus also in the cylinder 11 of the first pulley within a range of line pressure levels applied in the CVT.

Figure 2:
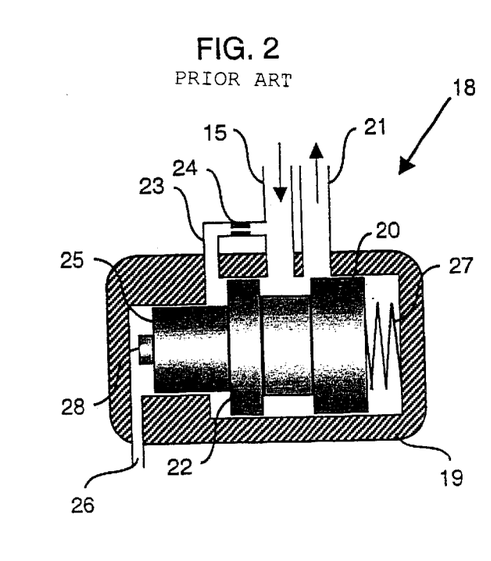
FIG. 2 is simplified cross sectional view of a line pressure valve.

The line pressure valve 18 is shown in more detail in FIG. 2. The valve 18 comprises a valve housing 19 and a valve body 20 slidably mounted in said valve housing 19. Depending on the position of the valve body 20 a smaller or larger flow of hydraulic medium is allowed to flow from the main hydraulic line 15 to another part of the hydraulic circuit, here denoted as hydraulic line 21. If said flow is smaller than the flow generated by the pump 17, the line pressure $P_{LP}$ increases and vice versa. The position of the valve body 20 is determined by a balance between, on the one hand, a force to the right, due to both the line pressure $P_{LP}$ acting on face 22 via passage 23, often provided with a hydraulic restriction 24, and the control pressure $P_{CP}$ acting on face 25 via passage 26, and, on the other hand, a force to the left, due to a spring 27. Thus, if the control pressure $P_{CP}$ is small, the line pressure $P_{LP}$ will become large in order to balance the force of said spring 27 and vice versa. The ratio between the surface areas of the faces 22 and 25 are usually chosen such that the maximum applied control pressure $P_{CP}$ level is small compared to the maximum applied line pressure level $P_{LP,max}$. Face 25 is provided with a protrusion 28 that prevents the blocking of the passage 26 by the valve body 20, when it is urged to the left.

The valve 18 shown in FIG. 2 is equipped with a spring 27, which means that, if no control pressure $P_{CP}$ is applied to face 25, the valve body 20 blocks the flow from hydraulic channel 13 to hydraulic channel 21 until the line pressure $P_{LP}$ acting on end surface face 22 is capable of moving the valve body 18 to the right against the force exerted by the spring 27. The NC-type valve 18 will thus set a maximum line pressure level $P_{LP,max}$ when the control pressure $P_{CP}$ is lowest. In case of a valve without a spring, the maximum applied line pressure level $P_{LP,max}$ is set when a maximum control pressure level $P_{CP,max}$ is applied. The construction of the latter type of valve is illustrated later in FIG. 11.

Returning to FIG. 1, a pressure regulator 29 is used to regulate the control pressure $P_{CP}$ in the passage 26. The pressure regulator 29 is fed with hydraulic medium via line 21 at an essentially constant feed pressure $P_{PR}$, which is somewhat higher than the maximum applied control pressure level $P_{CP,max}$. A feed pressure valve 30 determines the pressure level of the feed pressure $P_{PR}$. Valve 30 is of similar construction as valve 18, however, in this case no control pressure is applied, since the feed pressure $P_{PR}$ is essentially constant. The force exerted by spring 31 determines the feed pressure $P_{PR}$. The known control system is furthermore provided with a flow control valve 32 controlled by a control pressure regulated by an accompanying pressure regulator 33, which valve 32 determines the flow through the further line 16 either from the main hydraulic line 15 to the cylinder 12 of the second pulley 2, or from said cylinder 12 to a reservoir 34 for hydraulic medium, thereby controlling the pressure in said cylinder 12 at a level between the line pressure $P_{LP}$ and the pressure of the medium in the reservoir 34.

The feed pressure $P_{PR}$ supplied to the pressure regulators 29, 33 through line 21 is typically about 7.5 bar, whereas the pressure regulators 29, 33 are capable of deriving a control pressure $P_{CP}$ from said feed pressure $P_{PR}$ approximately between 0 and 6 bar. Excess hydraulic medium is allowed to flow from the valves 30, 32 and the pressure regulators 29, 33 to a reservoir for hydraulic medium 34. The pressure regulators 29, 33 are of generally known construction and are electronically operable by means of an electronic system comprising an ECU 35 which determines appropriate control currents $I_{PC}$ for said pressure regulators 29, 33 based on suitable variables, such as the transmission ratio i, the rotational speed of the first pulley Nf and the torque T to be transmitted by the CVT.

Figure 3:
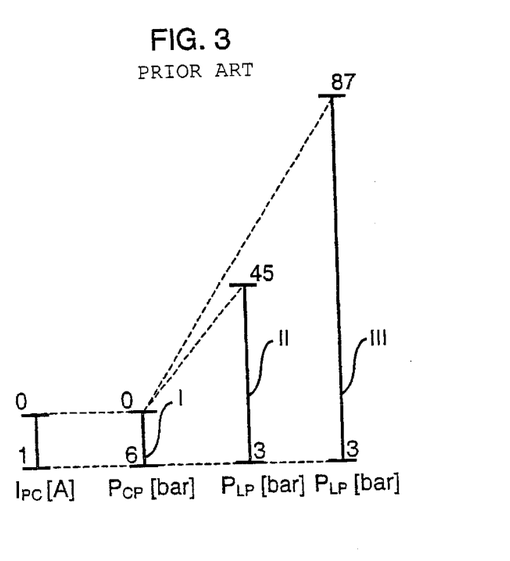
FIG. 3 shows the relation between control current, control pressure and line pressure for the known CVT.

Although the known CVT functions satisfactory per se, the efficiency of contemporary CVT designs is not optimal as is illustrated in FIG. 3. Typically applied line pressures $P_{LP}$ in conventional CVTs range from a few bar up to 45 bar as shown by range II. Within said range the line pressure $P_{LP}$ is controlled using control pressures $P_{CP}$ in a range I ranging from about 0 to 6 bar dependent on a control current $I_{PC}$, which may vary within a range from about 0 to 1 ampere. In other words, the amplification factor of the control system, which is defined here as the range 11 of applied line pressure $P_{LP}$ divided by the range I of applied control pressures $P_{CP}$ is typically about 7. Unavoidable inaccuracies in the control pressure $P_{CP}$ thus result in inaccuracies in the line pressure $P_{LP}$ that are about 7 times larger. In the presently favoured CVT designs, however, the applied line pressures $P_{LP}$ may range from a few bar to 80 bar or even more, as shown by range III, which yields an amplification factor of about 14 or even more. Because of this large amplification, the inaccuracy of the actual level of the line pressure $P_{LP}$ in the main hydraulic line 15 is rather large. Although the control system may be designed so that on average the actual line pressure $P_{LP}$ approximates a desired level for that pressure, the actual line pressure $P_{LP}$ is quite unstable and may at times deviate considerably from the average level. This necessitates the application of line pressures $P_{LP}$ which are considerably higher than the line pressure $P_{LP}$ required to adequately prevent mutual tangential movement of the drive belt 10 and the discs 5, 7 or 6, 8 of a pulley 1 or 2, i.e. belt slip, thereby negatively adverting the transmission efficiency.

Figure 4:
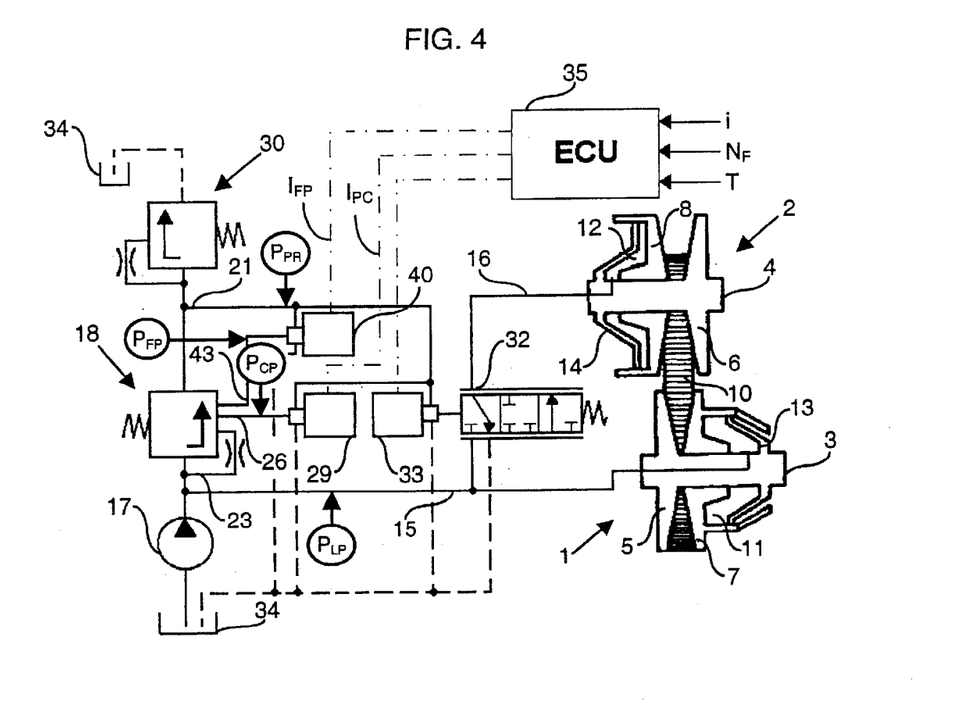
FIG. 4 shows a schematic representation of a CVT with an electronic control system according to a first embodiment of the invention.
Figure 5:
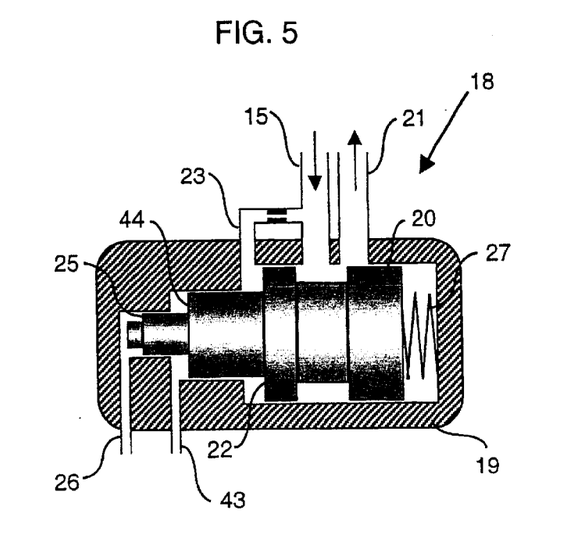
FIG. 5 is a simplified cross sectional view of a line pressure valve suited for application in the CVT according to FIG. 4.
Figure 6:
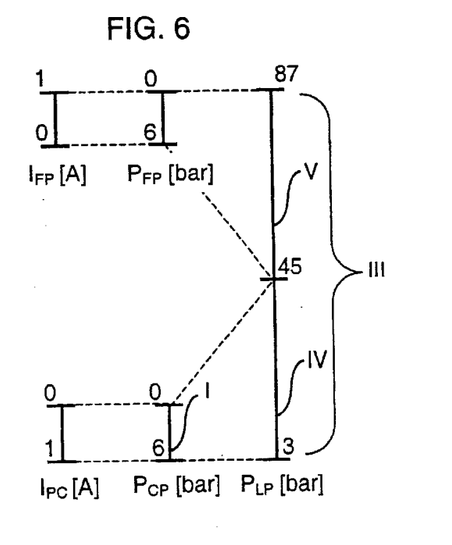
FIG. 6 shows a preferred relation between control current, control pressure and line pressure for the CVT according to FIG. 4.

In FIG. 4 a schematic representation of a CVT with an electro-hydraulic control system according to a first embodiment of the invention is shown. The control system comprises pressure control means 40; 41; 42 which are provided with a further pressure regulator 40 capable of regulating a further control pressure which serves as the further pressure $P_{FP}$ for influencing the line pressure $P_{LP}$. Like the pressure regulator 29 the further pressure regulator 40 is controlled by a control current $I_{FP}$ which is generated by the ECU 35. The valve body 20 of the line pressure valve 18 is provided with a further face 44 for allowing said further pressure $P_{FP}$ to influence the line pressure as is shown in FIG. 5. The control system is also provided with a passage 43, connecting said further regulator 40 with the line pressure valve 18. The effect of this elaboration of the invention on the dependency of the line pressure $P_{LP}$ on the control pressure $P_{CP}$ and on the further pressure $P_{FP}$ is shown in FIG. 6. In this case the surface areas of the faces 25 and 44 are chosen such that both the pressure regulator 29 and the further pressure regulator 40 are capable of controlling the line pressure $P_{LP}$ in an equal part IV respectively V of the range of applied line pressure levels III. Thus, when both the control pressure $P_{CP}$ and the further pressure $P_{FP}$ are at their maximum level (typically about 6 bar), the line pressure $P_{LP}$ at its minimum level, which in this example is 3 bar. When the control pressure $P_{CP}$ is regulated to its minimum level (typically about 0 bar), the line pressure $P_{LP}$ is controlled in the lower part IV of the total line pressure range from said minimum level to an intermediate level, which in this example is 45 bar. When subsequently the further pressure $P_{FP}$ is regulated to its minimum level, the line pressure $P_{LP}$ is controlled in an upper part V of the total line pressure range from said intermediate level to a maximum level, which in this example is 87 bar. It is thus achieved that the range of control pressures levels (I) is used to control the line pressure $P_{LP}$ within only a part of the total range of line pressures $P_{LP}$. In the example shown in FIG. 6 the amplification factor of the control system is essentially halved through the presence of the further pressure regulator 40 regulating the further pressure $P_{FP}$, thereby radically improving the accuracy of the control system.

An additional advantage of this particular elaboration of the invention is that the efficiency and the driveability of the CVT may also be improved it those situations wherein the electric control system fails, for example due to an empty car battery. This may be understood as follows. In the known CVT shown in FIG. 1 the control system is arranged such that the pressure regulator 26 automatically regulates the control pressure $P_{CP}$ to its minimum level when it receives no control current $I_{PC}$. Thus under these circumstances the maximum line pressure level $P_{LP,max}$ is applied so as to prevent drive belt 10 slip at all times. Because of the constantly applied maximum line pressure level $P_{LP,max}$, the efficiency of the transmission will be very poor and the load on the drive belt 10 very high, which may cause unnecessary wear of the drive belt 10. The control system according to the invention is equipped with two pressure regulators 26 and 40. Such pressure regulators 26 and 40 operate similar to either the different types of valve 18 discussed earlier. A pressure regulator provided with a spring is called a Normally Open (NO)-type valve, whereas a pressure regulator without a spring is called a Normally Closed (NC)-type valve. The control system may thus be arranged such that during electrical failure the pressure regulator 26 automatically regulates the control pressure $P_{CP}$ to its minimum level, whereas the further pressure regulator 40 automatically regulates the further pressure $P_{FP}$ to its maximum level, or vice versa. In this manner, the force on the valve body 20 of the line pressure valve 18 is not zero during electrical failure, but is determined by the further pressure $P_{FP}$ acting on the further face 44. The line pressure $P_{LP}$ applied is thus not at its maximum level $P_{LP,max}$ but at somewhat lower level which is dependent on the surface area of face 44 and the level of the further pressure $P_{FP}$, thereby improving the efficiency of the transmission reducing the load on the drive belt 10.

Figure 7:
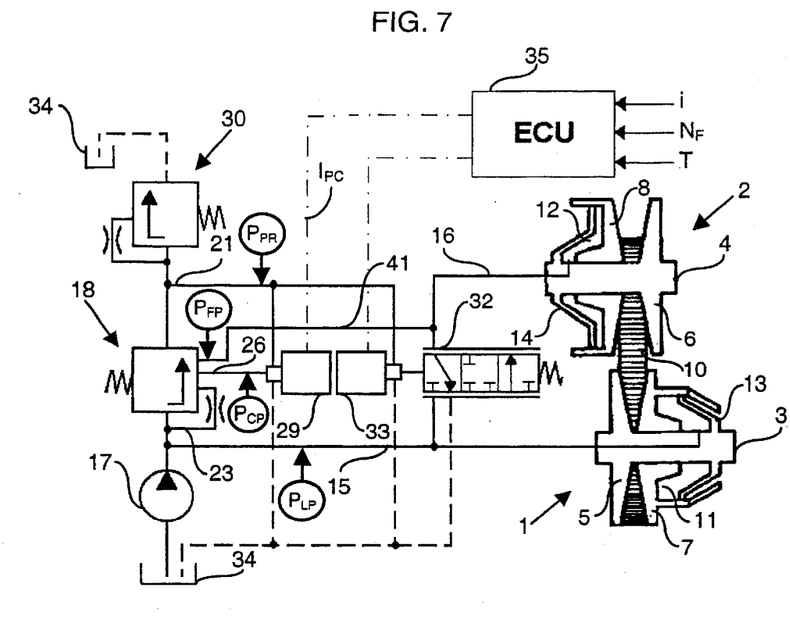
FIG. 7 shows a schematic representation of a CVT with an electronic control system according to a second embodiment of the invention.
Figure 8:
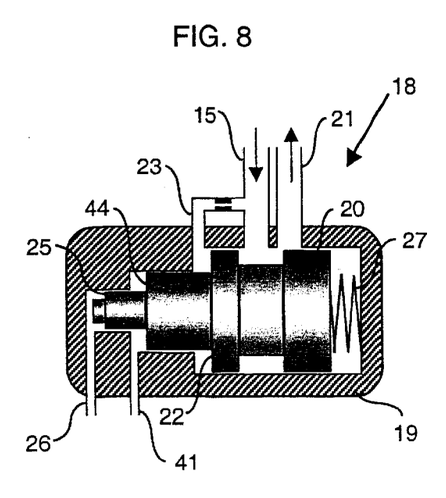
FIG. 8 is a simplified cross sectional view of a line pressure valve suited for application in the CVT according to FIG. 7.
Figure 9:
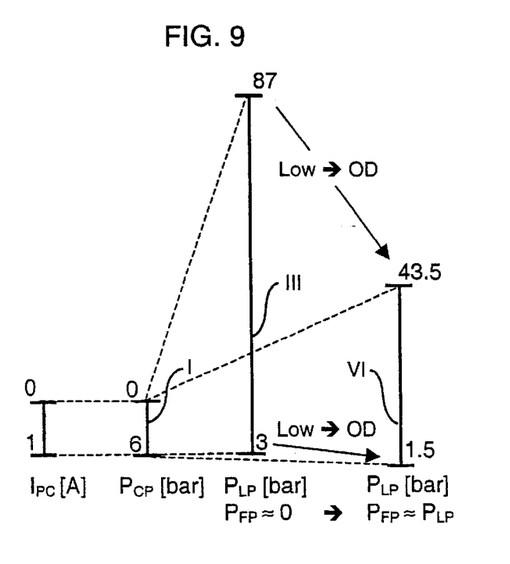
FIG. 9 shows a preferred relation between control current, control pressure and line pressure for the CVT according to FIG. 7.

In FIG. 7 a schematic representation of a CVT with an electro-hydraulic control system according to a second embodiment of the invention is shown. This elaboration of the invention is particularly suited for a CVT wherein the pressure in the cylinder 12 of the piston/cylinder assembly 12, 14 associated with the second pulley 2 is derived from the line pressure $P_{LP}$, so that the ratio between the pressure in said cylinder 12 and the pressure in the cylinder 11 of the piston/cylinder assembly 11, 13 associated with the first pulley lies always between 0 and 1. The pressure control means 41; 42; 43 according to this elaboration comprise a hydraulic passage 41, which connects the piston/cylinder assembly 12, 14 associated with the second pulley 2 with the line pressure valve 18, so that the pressure in said cylinder 12 serves as said further pressure $P_{FP}$, as is shown in FIG. 8. The face 44 of the line pressure valve 18 now allows the pressure in said cylinder 12 of the second pulley 2 to exert a force on the valve body 20 thereby influencing the line pressure $P_{LP}$. The effect of the pressure control means 40; 41; 42 according to this elaboration of the invention on the dependency of the line pressure $P_{LP}$ on the control pressure $P_{CP}$ and on the further pressure $P_{FP}$ is shown in FIG. 9. It may readily be understood that, when said pressure in the cylinder 12 of the piston/cylinder assembly 12, 14 associated with the second pulley 2 approximates zero, the behaviour of the line pressure valve 18 is unchanged with respect to the prior art discussed earlier with reference to FIGS. 1 to 3. However, during normal operation of the CVT said latter pressure ratio increases from near zero to the level of the line pressure $P_{LP}$ when the transmission ratio i increases from Low-ratio, wherein the running radius of the drive belt 10 between the discs 5, 7 of the first pulley 6, 8 is smallest, to OD-ratio, wherein said running radius is largest, and vice versa. As is shown in FIG. 9, this effects a change in the range of line pressures $P_{LP}$ that may be controlled by means of the line pressure valve 18, such that said range becomes smaller when said pressure in the cylinder 12 increases. It is thus achieved by the invention that the amplification factor of the control system decreases. In this example said factor decreases from 14 in the Low-ratio to 7 in the OD-ratio, yielding a considerable more accurate transmission control in OD than in Low.

Figure 10:
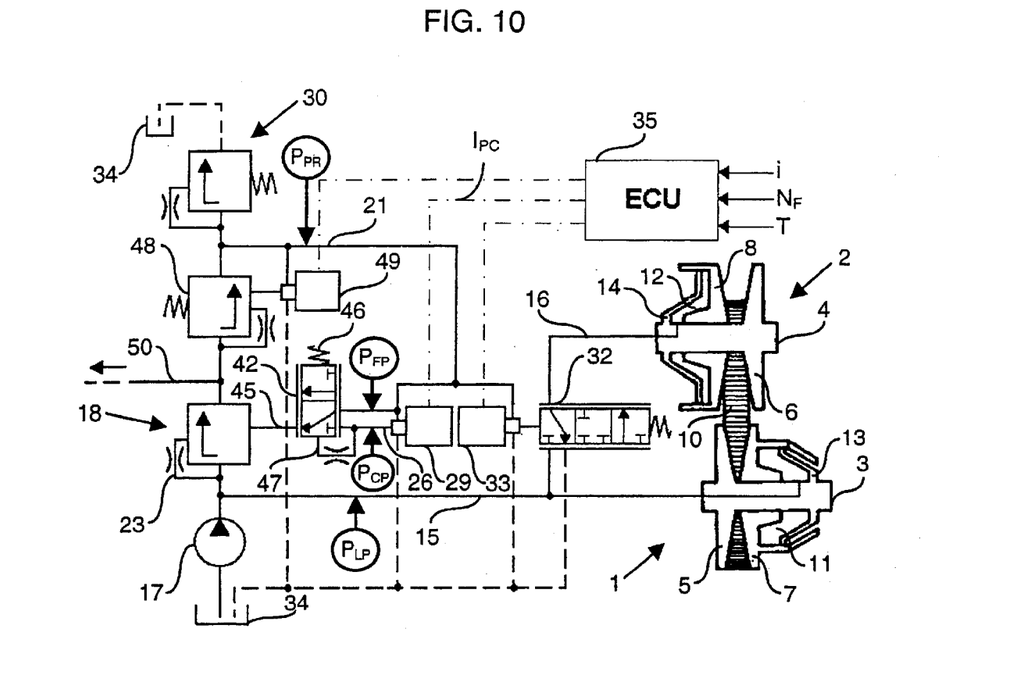
FIG. 10 shows a schematic representation of a CVT with an electronic control system according to a third embodiment of the invention.
Figure 11:
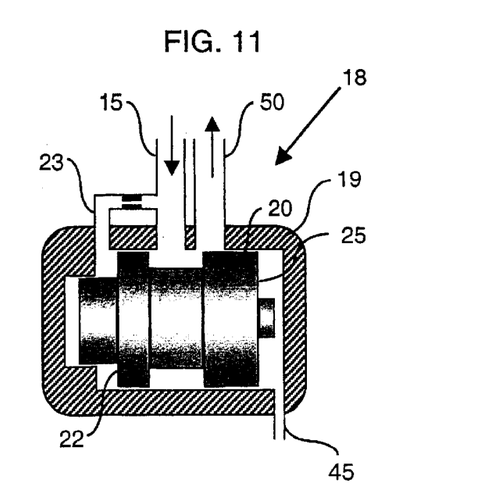
FIG. 11 is simplified cross sectional view of a line pressure valve suited for application in the CVT according to FIG. 10.
Figure 12:
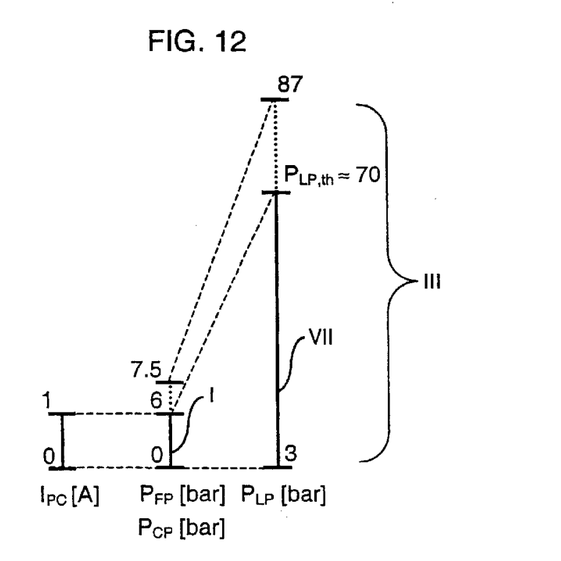
FIG. 12 shows the preferred relation between control current, control pressure and line pressure for the CVT according to FIG. 10.

In FIG. 10 a schematic representation of a CVT with an electro-hydraulic control system according to a third embodiment of the invention is shown. In FIG. 10 an additional pressure control valve 48 and an additional pressure regulator 49 are shown. Said valve 48 and said pressure regulator 49 are used to control a pressure in line 50 which leads to other parts of the hydraulic circuit, such as a sub-circuit for lubrication of for the control of clutches in the CVT. The pressure control means 40; 41; 42 according to this elaboration of the invention are provided with a further valve 42 in the form of a switch valve, which is capable of selectively allowing the line pressure $P_{LP}$ to be influenced either by said control pressure $P_{CP}$ or by an essentially constant auxiliary pressure $P_{AUX}$, which serves as said further pressure $P_{FP}$. A hydraulic passage 45 connects said switch valve 42 to the line pressure valve 18. In the construction shown in FIG. 10 the pressure regulator feed pressure $P_{PR}$ serves as said auxiliary pressure $P_{AUX}$ and thus as said further pressure $P_{FP}$, however, any essentially constant pressure in the control system, such as a lubrication pressure, could be a suitable auxiliary pressure $P_{AUX}$. The further valve 42 is operated by on the one hand the control pressure $P_{CP}$ regulated by the pressure regulator 29 and on the other hand a spring 46, whereby said valve 42 is arranged such that a first hydraulic connection 26, 45, is established between the pressure regulator 29 and the line pressure valve 18 when said control pressure $P_{CP}$ is lower than its maximum level $P_{CP,max}$, whereas, when said control pressure $P_{CP}$ is substantially at said maximum level $P_{CP,max}$, a second hydraulic connection 21, 45 is established between the feed pressure valve 30 and the line pressure valve 18. In effect it is thus achieved that the line pressure valve 18 is controlled by the control pressure $P_{CP}$ when said control pressure $P_{CP}$ is lower than its maximum level $P_{CP,max}$, whereas when the maximum control pressure level $P_{CP,max}$ is applied the line pressure valve 18 is set by the constant further pressure $P_{FP}$. In FIG. 11 a line pressure valve 18 suited for this particular elaboration of the invention is shown. The valve is not provided with a spring and the control pressure $P_{CP}$ and the line pressure $P_{LP}$ act on opposite sides of the valve body 20. In this case the line pressure $P_{LP}$ is high when the control pressure $P_{CP}$ is high and vice versa. The effect of this elaboration of the invention on the control system is shown in FIG. 12. As is shown, the control pressure $P_{CP}$ varies within a range from 0 and 6 bar depending on the current $I_{CP}$ applied to the pressure regulator 29. The faces 22 and 25 of the line pressure valve 18 are dimensioned such that the line pressure $P_{LP}$ varies between a few bar and a threshold pressure $P_{LP,th}$ of about 70 bar in dependence on said control pressure $P_{CP}$. When the maximum control pressure level $P_{CP,max}$ is regulated said second hydraulic connection is established and the line pressure is set at is maximum level $P_{LP,max}$ by said further pressure $P_{FP}$, which in this case is the pressure regulator feed pressure $P_{PR}$. It is thus achieved by the invention that the amplification factor of the control system is improved by a factor which is equal to the ratio between the maximum applied line pressure level $P_{LP,max}$ and the threshold pressure $P_{LP,Up}$, which in turn is equal to the ratio between $P_{FP}$ and $P_{CP,max}$, which means that said factor is typically about 1.25.

What is claimed is:

1. Continuously variable transmission provided with a first pulley (1) having two pulley discs (5, 7), with a second pulley (2) having two pulley discs (6, 8) and with a drive belt (10) wound around said pulleys (1, 2) for transmitting torque therebetween, at least one disc (7) of the first pulley (1) being axially movable with respect to the other disc (5) of said pulley (1) under the influence of an axial force provided on said movable disc (7) by a hydraulic pressure in a cylinder (11) of a piston/cylinder assembly (11, 13) associated with said first pulley (1), the continuously variable transmission is further provided with a control system capable of controlling the pressure in said cylinder (11) and comprising a pump (17) for generating a flow of hydraulic medium from a reservoir (34) to a main hydraulic line (15)

and a line pressure valve (18) at least operable by a control pressure ($P_{CP}$) which is regulated by an electronically operable pressure regulator (29), for controlling a line pressure ($P_{LP}$) in said main hydraulic line (15), characterized in that the control system additionally comprises a pressure control means (40; 41; 42) capable of influencing the line pressure ($P_{LP}$) by providing further pressure ($P_{FP}$) on a part (20) of the line pressure valve (18), wherein the pressure in the cylinder (11) of the piston/cylinder assembly (11, 13) associated with the first pulley (1) is always essentially equal to the line pressure ($P_{LP}$) and wherein at least one disc (8) of the second pulley (2) also being axially movable with respect to the other disc (6) of said pulley (2) under the influence of an axial force provided on said movable disc (8) by a hydraulic pressure in a cylinder (12) of a piston/cylinder assembly (12, 14) associated with the second pulley (2), characterized in that the pressure control means (40; 41; 42) comprise a passage (41) for directing the pressure in the cylinder (12) of the piston/cylinder assembly (12, 14) associated with the second pulley (2) to the line pressure valve (18) such that said pressure serves as said further pressure ($P_{FP}$), the piston/cylinder assembly (11, 13) of the first pulley and the piston/cylinder assembly (12, 14) of the second pulley being in a master-slave arrangement.

2. Continuously variable transmission according to claim 1, wherein the line pressure valve (18) is provided with a valve body (20) slidably mounted in a valve housing (19) whereby a position of said valve body (20) within the valve housing (18) is determined by a balance of a number of forces acting on said valve body (20), said forces at least comprising a force exerted by the line pressure ($P_{LP}$) on a face (22) of said body (20) and a force exerted by the control pressure ($P_{CP}$) on another face (25) of said body (20), characterised in that, the further pressure ($P_{FP}$) is provided on a face (25, 44) of the valve body (20) thereby exerting a force on the valve body (20) which influences said balance.

3. Continuously variable transmission according to claim 1, characterized in that the control system is arranged such that the pressure in the cylinder (12) of the piston/cylinder assembly (12, 14) associated with the second pulley (2) is determined by a flow control valve (32) capable of determining a flow of hydraulic medium from the main hydraulic line (15) to said cylinder (12) and a flow from said cylinder (12) to the reservoir (34).

4. Continuously variable transmission according to claim 1, characterized in that the line pressure valve (18) is arranged such that, when the pressure in the cylinder (12) of the piston/cylinder assembly (12, 14) associated with the second pulley (2) is highest, the highest line pressure ($P_{LP}$) to be applied in dependence on the control pressure ($P_{CP}$) is essentially halve the highest line pressure ($P_{LP}$) to be applied in dependence on the control pressure ($P_{CP}$) when the pressure in the cylinder (12) of the piston/cylinder assembly (12, 14) associated with the second pulley (2) is lowest.

5. Continuously variable transmission according to claim 1, characterised in that, in the continuously variable transmission a range of line pressure levels is applied having a maximum level ($P_{LP,max}$) which is more than 45 bar.

6. Continuously variable transmission provided with a first pulley (1) having two pulley discs (5, 7), with a second pulley (2) having two pulley discs (6, 8) and with a drive belt (10) wound around said pulleys (1, 2) for transmitting torque therebetween, at least one disc (7) of the first pulley (1) being axially movable with respect to the other disc (5) of said pulley (1) under the influence of an axial force provided on said movable disc (7) by a hydraulic pressure in a cylinder (11) of a piston/cylinder assembly (11, 13) associated with said first pulley (1), the continuously variable transmission is further provided with a control system capable of controlling the pressure in said cylinder (11) and comprising a pump (17) for generating a flow of hydraulic medium from a reservoir (34) to a main hydraulic line (15) and a line pressure valve (18) at least operable by a control pressure ($P_{CP}$) which is regulated by an electronically operable pressure regulator (29), for controlling a line pressure ($P_{LP}$) in said main hydraulic line (15), characterized in that the control system additionally comprises a pressure control means (40; 41; 42) capable of influencing the line pressure ($P_{LP}$) by providing further pressure ($P_{FP}$) on a part (20) of the line pressure valve (18), wherein the control system is arranged such that the pressure in the cylinder (12) of the piston/cylinder assembly (12, 14) associated with the second pulley (2) is determined by a flow control valve (32) capable of determining a flow of hydraulic medium from the main hydraulic line (15) to said cylinder (12) and a flow from said cylinder (12) to the reservoir (34).

* * * * *